US006826331B2

(12) United States Patent
Barwicz et al.

(10) Patent No.: US 6,826,331 B2
(45) Date of Patent: Nov. 30, 2004

(54) METHOD OF EXTRACTING SPECTRAL PARAMETERS OF CHANNELS FROM NON-CHANNELIZED LIGHT

(75) Inventors: Andrzej Barwicz, Trois-Rivières (CA); Roman Z. Morawski, Warsaw (PL); Mohamed Ben Slima, Trois-Rivières (CA); Andrzej Miekina, Warszawa (PL); Michal Wisniewski, Trois-Rivières (CA)

(73) Assignee: Bookham Technology plc, Abingdon (GB)

( * ) Notice: Subject to any disclaimer, the term of this patent is extended or adjusted under 35 U.S.C. 154(b) by 0 days.

(21) Appl. No.: 09/964,509

(22) Filed: Sep. 28, 2001

(65) Prior Publication Data

US 2003/0063854 A1 Apr. 3, 2003

(51) Int. Cl.[7] .................................................. G02B 6/34
(52) U.S. Cl. ...................... 385/37; 385/46; 385/129; 385/132
(58) Field of Search .......................... 385/10, 31, 37, 385/43, 46, 48, 122, 129, 130, 131, 132

(56) References Cited

U.S. PATENT DOCUMENTS

| | | | |
|---|---|---|---|
| 5,745,616 A | * 4/1998 | Zirngibl | ............ 385/37 |
| 6,002,479 A | 12/1999 | Barwicz et al. | |
| 6,078,709 A | 6/2000 | Abramov et al. | |
| 6,377,730 B1 | * 4/2002 | Bergmann et al. | ............ 385/39 |
| 6,469,814 B1 | 10/2002 | Park et al. | |

FOREIGN PATENT DOCUMENTS

| | | |
|---|---|---|
| EP | 0942265 A | 9/1999 |
| GB | 2324667 A | 10/1998 |
| GB | 2334641 A | 8/1999 |
| GB | 0021240.7 | 8/2000 |
| GB | 0021240.7 | 10/2000 |
| GB | 0107112.5 | 3/2001 |
| GB | 0109656.9 | 4/2001 |
| GB | 0107112.5 | 5/2001 |
| GB | 0109656.9 | 6/2001 |
| KR | 2000031647 A | 6/2000 |
| WO | WO 9957834 | 11/1999 |
| WO | WO 99/57834 | 11/1999 |
| WO | WO 9967609 A | 12/1999 |
| WO | WO 0122624 A | 3/2001 |

* cited by examiner

Primary Examiner—Robert H. Kim
Assistant Examiner—Michael H Caley
(74) Attorney, Agent, or Firm—Dowell & Dowell, P.C.

(57) ABSTRACT

A method of assembly is presented for a multi-wavelength optical monitor (MWOM) for use in fibre optic telecommunication networks. The method allows coarse optimisation to be used to align an input optical fibre and detector array relative to a wavelength division demultiplexing element. The detector array output data are transformed with a digital signal processor into relative intensities of the components of the spectrum or spectral parameters of telecommunication channels.

33 Claims, 9 Drawing Sheets

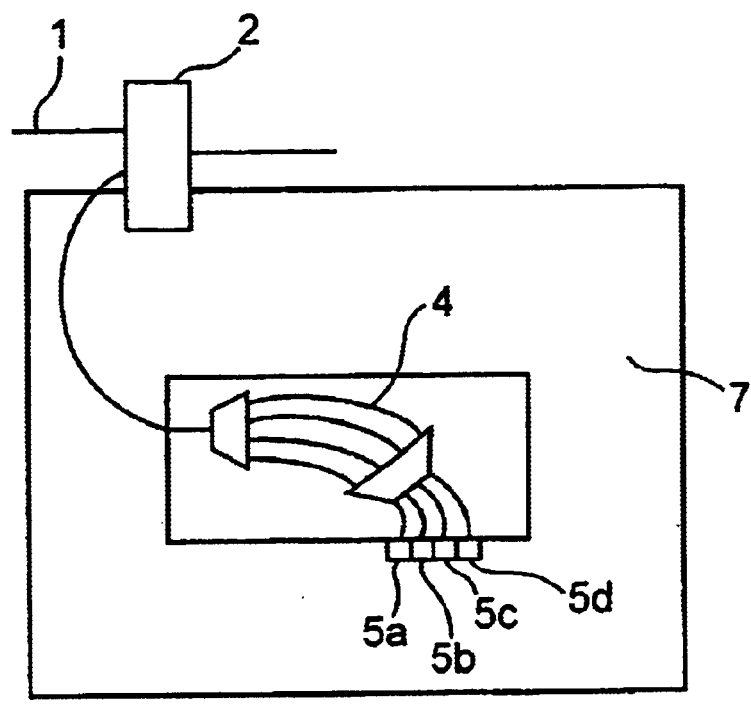
(Prior Art) Fig. 1
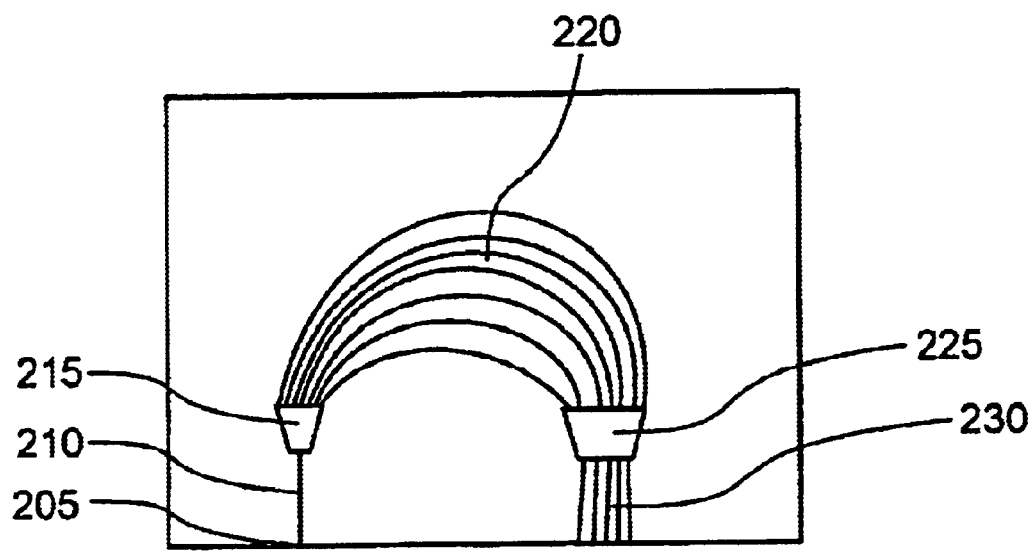
(Prior Art) Fig. 2

US 6,826,331 B2

METHOD OF EXTRACTING SPECTRAL PARAMETERS OF CHANNELS FROM NON-CHANNELIZED LIGHT

FIELD OF THE INVENTION

This invention relates generally to multi-wavelength optical monitors and more particularly to optical signal monitors in dense wavelength division applications.

BACKGROUND OF THE INVENTION

The rapid adoption of the Internet has created a need for high-speed optical networks. The deployment of these networks has been hindered by a lack of optical components. These components tend to be difficult to build mainly due to the precise tolerances needed to achieve good optical coupling.

An area that has shown promise in alleviating the manufacturing bottleneck is integrated waveguide technology. Waveguides can be formed using similar processes to those used for manufacturing integrated circuits. This allows for mass production of precise components. Unfortunately, two main problems result. First, the waveguide devices are often temperature sensitive requiring special packaging considerations and, second, it is difficult to couple light into and out of the waveguide device absent substantial losses.

An optical monitor is a critical component in optical networks. Typically optical monitors accompany multi-wavelength fibre optic amplifiers, such as erbium doped fibre amplifiers; the optical monitors are used for providing feedback to the amplifiers or to a controller. They are also useful in ensuring maintained coupling efficiencies and in test equipment for optical communication equipment.

Conventional optical monitors for multi-wavelength fibre optic communication needs come in a variety of different configurations. In U.S. Pat. No. 6,078,709 an optical monitor is demonstrated. The monitor has a grating in a fibre for deflecting a portion of light propagating within the fibre out of the fibre. This deflected portion is then detected with a detector. The grating achieves multi-wavelength behaviour through application of heat in order to vary its frequency response. As the grating expands, the wavelength of light that it deflects changes. By controlling the temperature precisely a known wavelength is monitored precisely. This design has the benefit of being able to monitor any wavelength within a given range, however it is only capable of supporting monitoring of one wavelength channel at a time. Further, a precise heating element is required to provide adequate performance.

Another common method for performing multi-wavelength monitoring is to tap off some of a light signal and to use a wavelength dispersing element in order to separate the light such that light within each channel is incident upon a different detector from a plurality of optical detectors. This device has the advantage that all of the wavelengths are monitored at once. Unfortunately, such a device is often produced in bulk optics and is hampered by the above-mentioned manufacturing bottlenecks. When manufactured with integrated optical technology, the resulting demultiplexer has many output ports for coupling to fibres and, as such, is extremely difficult to manufacture.

The prior art is limited in that the optical connections between the various components must be very accurate to ensure that the optical signals are not overly attenuated before reaching the monitor. Of course, if all errors were identical, the monitor error would be less significant but, since each alignment error is somewhat unknown, the resulting errors compound to render such a monitoring device unreliable on the one hand and overly costly to produce on the other.

Additionally, errors in coupling contribute to other known issues such as polarisation-dependent loss (PDL), which becomes a factor in the monitor efficiency and accuracy.

Since prior-art multi-wavelength monitors rely on a wavelength division demultiplexing—either using a single filter to drop one wavelength or a dispersive element to demultiplex the channels—to produce specific wavelength output signals they are subject to wavelength drift in the demultiplexer due to temperature changes. Currently, this is compensated for by mechanically moving the input fibre as the temperature varies. Alternatively, the demultiplexer is heated to a constant temperature. Either solution is effective but increases the cost and complexity of the monitor.

Another disadvantage of the prior art is that it results in a monitor having fixed characteristics. For example, a 32-channel monitor is limited to that exact function. Even when 32 channels monitors are obsolete or when different channel allocation is used, the monitor, because its characteristics are formed in the physical component, is limited to the original 32 channel applications.

OBJECT OF THE INVENTION

In order to overcome these and other shortcomings of the prior art it is an object of the invention to provide an optical wavelength monitor absent a need for extremely precise alignment needed in conventional optical components.

SUMMARY OF THE INVENTION

This invention relates generally to optical monitors and more particularly to the optical-alignment and the production of optical signal monitors for dense wavelength division applications.

In accordance with the invention there is provided a method of fabricating an optical component comprising the steps of:

providing a detector array having more detectors than a number of known channels;

providing an input port and a dispersive element within a waveguide structure, the dispersive element disposed for receiving light provided at the input port and for dispersing the light onto the detector array, the light dispersed other than as channelised data within the known channels; and, determining a mathematical model for transforming light detected by the detector array into values indicative of intensity of light within each of the predetermined wavelength ranges corresponding to the known channels.

In accordance with another embodiment of the invention, there is provided a method of fabricating an optical component having an input endface comprising the steps of:

providing a dispersive element within a waveguide structure, the dispersive element disposed for receiving light provided at a input endface of the waveguide structure and for dispersing the light onto an output endface of the waveguide structure, the light dispersed other than as channelised data within known channels;

affixing a detector array having more detectors than a number of the known channels to the output endface of the waveguide;

electrically coupling the detector array for providing detected data to a processor for processing thereof, and, determining a mathematical model for transforming light detected by the detector array into values indicative of intensity of light within each of the predetermined wavelength ranges corresponding to the known channels, the transfer function accommodating imprecise placement of the detector array and variations in a location on the input endface where light is received.

In accordance with another aspect of the invention, there is provided an optical component comprising:

an input port;

a detector array having more detectors than a number of known channels; a waveguide structure including a dispersive element within the waveguide structure, the dispersive element disposed for receiving light provided at the input port and for dispersing the light onto the detector array, the light dispersed other than as channelised data within the known channels; and a processor for transforming light detected by the detector array into values indicative of intensity of light within each of the predetermined wavelength ranges corresponding to the known channels, using a mathematical model of that relationship, the model accommodating imprecise placement of the detector array.

In accordance with the further aspect of the invention, there is provided an optical component comprising:

a waveguide structure including: an input endface, an output endface; and a dispersive element, the dispersive element disposed for receiving light provided near a predetermined location on the input endface of the waveguide structure and for dispersing the light about a location on the output endface near a predetermined location, the light dispersed other than as channelised data within known channels;

a detector array having more detectors than a number of the known channels disposed adjacent the output endface about the predetermined location for providing signals based on detected light; and, a processor for transforming data into values indicative of intensity of light within each of the predetermined wavelength ranges corresponding to the known channels, using a mathematical model of that relationship, the model making possible numerical compensation for at least one of imprecise placement of the detector array and variations in a location on the input endface where light is received.

The ability to use substantially coarse alignment without affecting the quality of monitoring the device is capable of performing is extremely advantageous. Further advantageously, thermal compensation can be performed by processing of the detected optical signals.

BRIEF DESCRIPTION OF THE DRAWINGS

The invention will now be described with reference to the attached drawings in which:

FIG. 1 is a simplified block diagram of a prior art multi-wavelength optical monitor;

FIG. 2 is a simplified block diagram of a prior art array waveguide grating;

DETAILED DESCRIPTION OF THE INVENTION

Figure 3A:
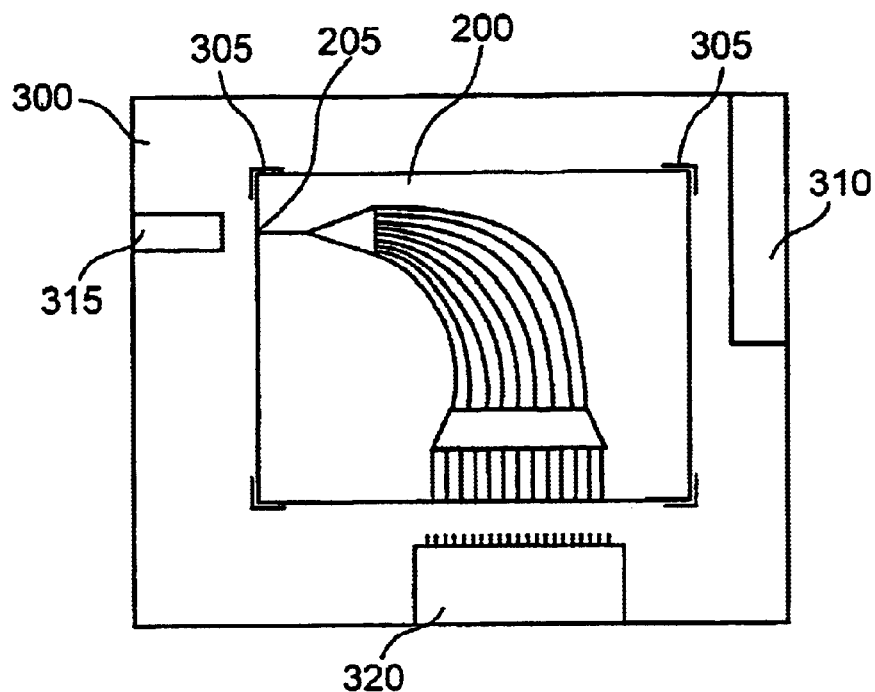
FIG. 3A is a simplified block diagram of an embodiment of a multi-wavelength optical monitor according to the invention.

The invention demonstrates a simple way of creating a multi-wavelength optical monitor (MWOM) without the need for the extremely precise alignment needed in conventional optical components.

The following notation is used for the description of the invention:

$\lambda$-wavelength; $\lambda \in [\lambda_{min}, \lambda_{max}]$;

N-number of data provided to the digital processor of MWOM;

$\Delta\lambda$-step of wavelength discretization; $\Delta\lambda=(\lambda_{max}-\lambda_{min})/(N-1)$ $\lambda_n$-n-th datum provided to the digital processor of MWOM; $\lambda_n=\lambda_{min}+(n-1)\Delta\lambda$ for n=1, ... ,N;

x($\lambda$)-real spectrum of the monitored light signal;

l-vector of center wavelengths, i.e. of the positions of peaks the spectrum x($\lambda$) is composed of; $l=[l_1 l_2 \ldots l_K]^T$;

$\hat{l}$-an estimate of l;

a-vector channel powers, i.e. of magnitudes of peaks the spectrum x($\lambda$) is composed of;

$a=[a_1 a_2 \ldots a_K]^T$;

$\hat{a}$-an estimate of a;

s($\lambda$;l,a)-an idealized spectrum of the monitored light signal, assumed to have the form:

$$s(\lambda; l, a) = \sum_{k=1}^{K} a_k v_s(\lambda, l_k)$$

where $v_s$; ($\lambda$,l) is an isolated, normalized peak in s($\lambda$;l,a), whose maximum is located at $\lambda=l$;

$$\int_{-\infty}^{+\infty} v_s(\lambda, l) d\lambda = 1$$

for $l \in [\lambda_{min}, \lambda_{max}]$;

$\{\tilde{y}_n\}$-spectrometric data representative of provided to the digital processor of MWOM;

$\{\tilde{y}_n\} \equiv \{\tilde{y}_n | n=1, \ldots, N\}$;

$x^{cal}(\lambda)$-real spectrum of a light signal used for calibration of the opto-electonic part of MWOM;

$s(\lambda; l^{cal}, a^{cal})$-an idealized spectrum of the light signal used for calibration of the opto-electonic part of MWOM;

$\{\tilde{y}_n^{cal}\}$-data, representative of $x^{cal}(\lambda)$, used for calibration of the opto-electonic part of MWOM; $\{\tilde{y}_n^{cal}\} \equiv \tilde{y}_n^{cal} | n=\{1, \ldots N^{cal}\}$;

G-an operator (algorithm) of projection mapping the idealized spectrum s($\lambda$;l, a) into the space of the data:

$$\{+\tilde{i}\,\tilde{y}+\tilde{i}_n\}=G[s(\lambda;l,a);p_G]$$

where $p_G$ is a vector or matrix of the parameters of the operator G to be determined during calibration of the of the opto-electonic part of MWOM; $p_G=[p_{G,1}p_{G,2}\ldots]^T$ or:

$$p_G = \begin{bmatrix} p_{G,1,1} & p_{G,1,2} & \cdots \\ p_{G,2,1} & p_{G,2,2} & \cdots \\ \vdots & \vdots & \ddots \end{bmatrix}$$

R-an operator of reconstruction, such as a generalized deconvolution operator, for transforming the data $\{\tilde{y}_n\}$ into an estimate $\hat{s}(\lambda)$ of $s(\lambda;l,a)$:

$$\hat{s}(\lambda)=R[\{\tilde{y}_n\};p_R]$$

where $p_R=[p_{R,1}p_{R,2}\ldots]^T$ is a vector or matrix of parameters of the operator R including regularization parameters, the parameters determined during calibration of the opto-electonic part of MWOM.

Referring to FIG. 1, a prior art optical wavelength division demultiplexer is shown for use, for example in optical monitoring. A fibre 1 is shown in which an optical signal propagates. A tap 2, in the form of a partially reflective mirror, is positioned to tap a small portion of the signal within the fibre in order to perform monitoring thereof. Of course, any of a number of known taps may be used. The tapped signal is directed toward an integrated waveguide demultiplexer in the form of an array waveguide grating for demultiplexing the tapped signal. The tapped signal propagates through the array waveguide grating 4, and is separated into different optical signals within separate wavelength channels. Each different optical signal is provided to a detector 5a, 5b, 5c, and 5d. The detectors detect the light incident thereon and provide numerical data, based on an intensity of incident light at a given time or during a given time period. A temperature compensation device in the form of a heating unit with feedback 7 is shown for performing required temperature compensation.

Referring to FIG. 2, a prior-art wavelength division demultiplexer 200 is shown. It comprises an array waveguide grating. Though the device is bidirectional in nature, it will be described herein in one direction—used as a wavelength division demultiplexer. A plurality of optical signals, each propagates at a different wavelength into the input port 205. The input port 205 is coupled to a waveguide 210 providing guiding of the optical signals into dispersive region 215. Once the light is dispersed, it propagates into grating waveguides 220 wherein phase differences are induced within the light within different waveguides of the grating waveguides 220 due to differences in waveguide path lengths. Upon exiting the grating waveguides 220, the light again propagates through a dispersive region 225 to a plurality of waveguides 230.

In order to manufacture the device of FIG. 2, exacting standards in waveguide etching are used, and—preferably—the waveguide path lengths are minimized in order to support maximal miniaturization of the overall device. Unfortunately, this results in manufacturing process problems unrelated to manufacture of the integrated device.

In order to use the array waveguide device, light must be coupled in to the input port and out of the output port(s). This is typically achieved using a mount assembly as part of the array waveguide grating packaging. The mount assembly allows for securing optical fibres to the integrated device in alignment with the input port and the output ports. Unfortunately, mechanical assemblies are difficult to design, manufacture and maintain with consistent optical results.

Referring to FIG. 3A, a mechanical assembly is shown for use in packaging of the array waveguide grating 200. Mount points 305 are shown for supporting the array waveguide grating 200. The packaging includes a temperature compensation device 310 in the form of a feedback control circuit and a heating element for maintaining the temperature inside the packaging so as to avoid temperature-induced variations in optical performance. A manufacturing guide 315 is disposed within the mechanical assembly or formed integrally therewith for aligning an optical fibre with the input port 205.

Because of the diameter of a fibre core, alignment between the fibre and the array waveguide grating must meet exacting standards. Typically, this requires a complex and expensive jig and a time consuming manufacturing process. Though the integrated device is manufactured with the benefits of integrated circuit technology and the automation thereof, the fibre is often mechanically affixed to the manufacturing guide by an individual or by an alignment mechanism. If this was the only fibre requiring coupling to the waveguide device, the problems associated therewith might be manageable. Unfortunately, in today's dense wavelength divisions multiplexing environments, there may be as many as 40 output ports each requiring alignment and affixing of a fibre. In future, it is estimated that more than one hundred output ports will be supported.

If there are forty-one fibres to attach, this requires alignment of 41 fibres to the integrated device and is both time consuming and requires very expensive manufacturing equipment. Also, the fibres are usually attached to the package and not to the integrated device 200. There are several reasons for this but essentially, a small gap between the fibre and the integrated device 200 is advantageous and filling that gap with material such as epoxy, leads to variations in optical performance over time. Unfortunately, because the fibre is not affixed directly to the integrated device, over time, motion in the fibre end affects optical alignment with the integrated device and as such, if relative motion occurs, the device typically becomes useless.

Another drawback to all prior-art manufacturing methods for forming integrated devices is the difficulty cleaving the edges of the integrated device to form a clean port for coupling with the fibre. It is often necessary to polish the endface of the device to provide accurate coupling of light into and out of the integrated device.

Figure 3B:
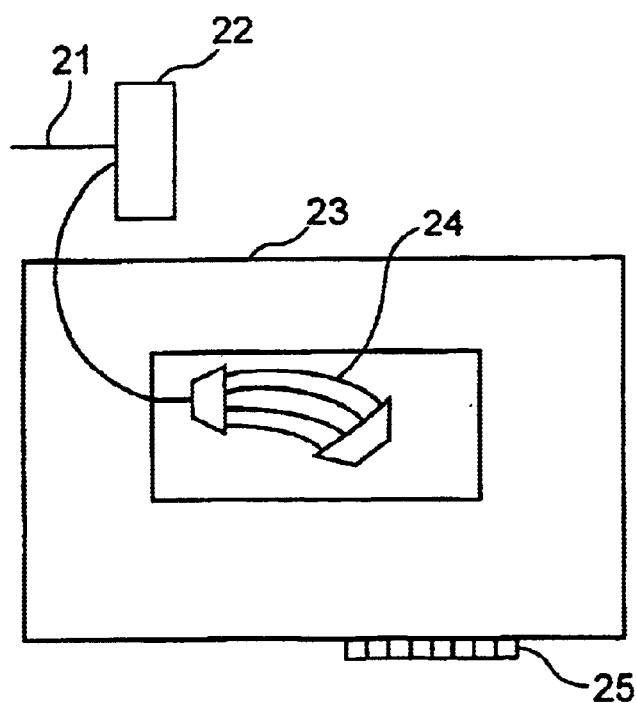
FIG. 3B is a simplified block diagram of an embodiment according to the invention.

Referring to FIG. 3B, a device similar to that of FIG. 1 is shown but according to the invention. Here the detector array 25 is affixed to an endface of the optical component adjacent an unguided region of the dispersive element and absent waveguides therebetween.

Figure 4:
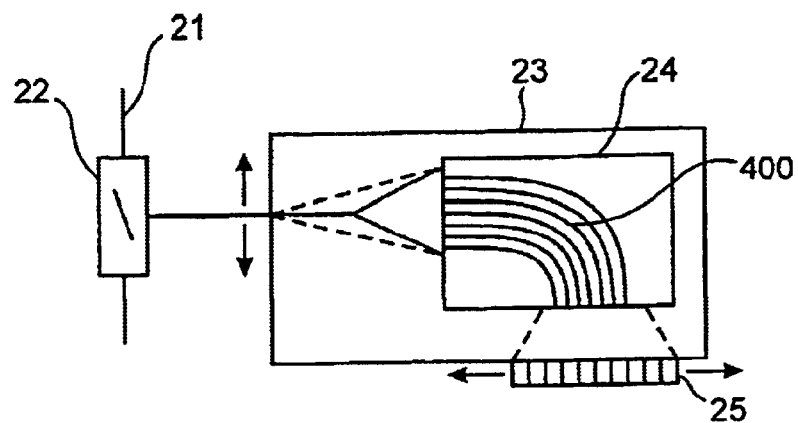
FIG. 4 is a simplified schematic diagram demonstrating coarse alignment of detector array relative to a substrate for an optical monitor.

Referring to FIG. 4, MWOM according to the invention is shown as an integrated waveguide device. An optical signal propagates through the fibre 21. The optical signal is tapped by the tap 22, and the tapped signal is provided to the integrated waveguide device 23. The integrated waveguide device includes a dispersive element 24 in the form of an array waveguide grating 400 to disperse the light in dependence upon wavelength. Dispersed light is incident upon an array of detectors 25 for detecting the dispersed light. The dispersive element 24 is positioned relative to the detectors 25 such that separated optical channels are not incident upon the detectors, however it does impart a displacement in the optical signals for different wavelengths. For example, as shown in FIG. 4, there are no waveguides from the dispersive element for guiding channelised data to the output ports. As a result, various channels of light may remain incident upon a same position of the endface of the integrated device and as such be detected by a same detector and—preferably—light within each channel is incident upon at least three different detector elements. This unchannelised spectrum is detected by the array of detectors 25 to form a quantised analogue spectrum of the light. Though the quantised analogue spectrum is not truly "analogue" in nature since it is quantised in two dimensions—wavelength and amplitude, it is not channelised in that light reaching a single detector is not necessarily confined to the light within a single channel. The light incident upon the detectors results in data from each detector, based on a magnitude of the light incident thereon.

Advantageously, by eliminating the output waveguides one reduces the overall size requirements for the integrated device thereby reducing cost of manufacturing further.

The data are provided to a processor for processing thereof to transform them into a more accurate spectral representation of the tapped optical signal. Accurate processing of the data is performed based on calibration results. The calibration is performed by providing one or more known optical signals to the device in order to determine characteristics of the device and alignment between the dispersive element 24 and the array of detectors 25. Transforming the input signal accurately generally requires that the device be calibrated with a known input signal. Since the device is calibrated after it has been assembled, the requirements for positioning the detector array and input port are not as critical as they would be in a conventional device. In this way, the calibration step compensates for the imperfections associated with alignment during manufacturing of the device.

The calibration may also act to compensate for optical imperfections in the device such as those introduced by cleaving, thereby reducing the required manufacturing quality for the endfaces of the integrated device.

Figure 7:
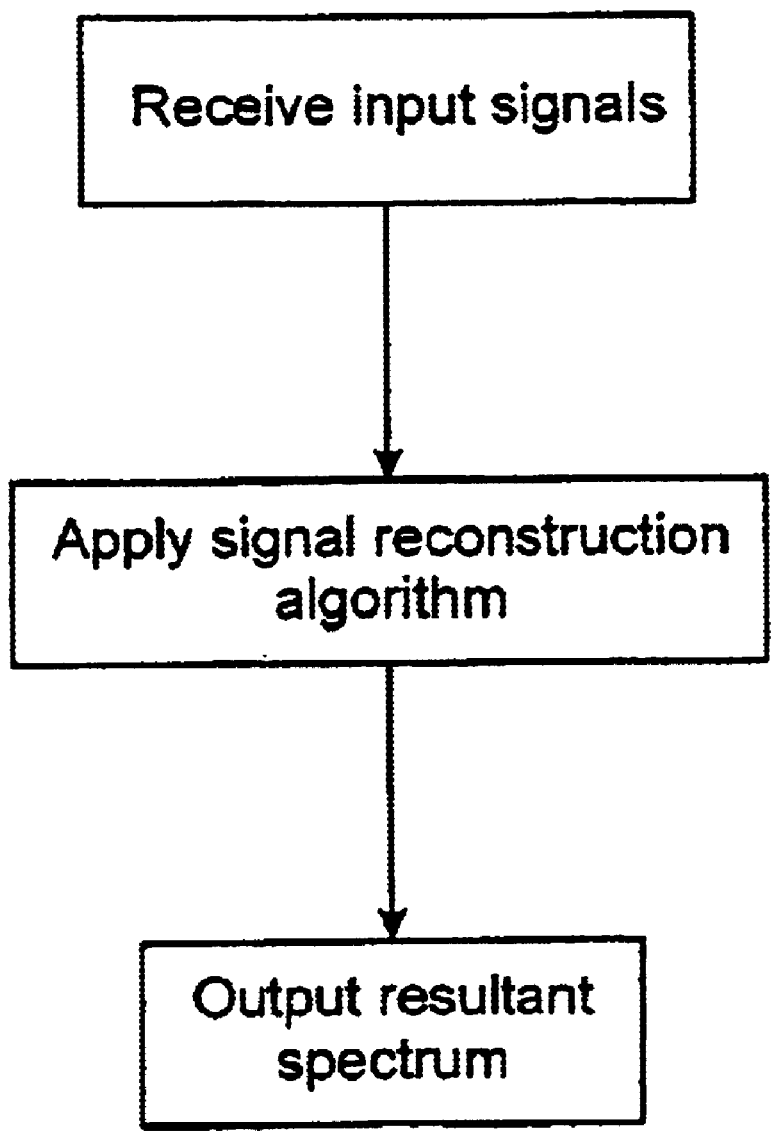
FIG. 7 illustrates the results of the consecutive stages of signal processing performed by the multi-wavelength optical monitor, according to the invention.

Referring to FIG. 7, a simplified flow diagram for a signal processing method for use in MWOM according to the invention is shown. Typically, the processing is executed by a digital signal processor forming part of MWOM. In this example, this processing includes ire computing of the parameters of the analysed light-spectrum, i.e. of the positions and magnitudes of peaks the spectrum is composed of.

Once the data are captured, their interpretation is not a straightforward task. Before they are interpreted, they must be corrected for manufacturing errors or imperfections. For example, when captured at a resolution of 10 nm, the data are not useful for most applications. In order to produce MWOM at a reasonable cost using the current invention, it is advantageous that a resolution of the captured data be augmented prior to channelisation. As proposed herein, the method of augmentation is based on the results of calibration. The augmentation process is set out below.

Figure 8:
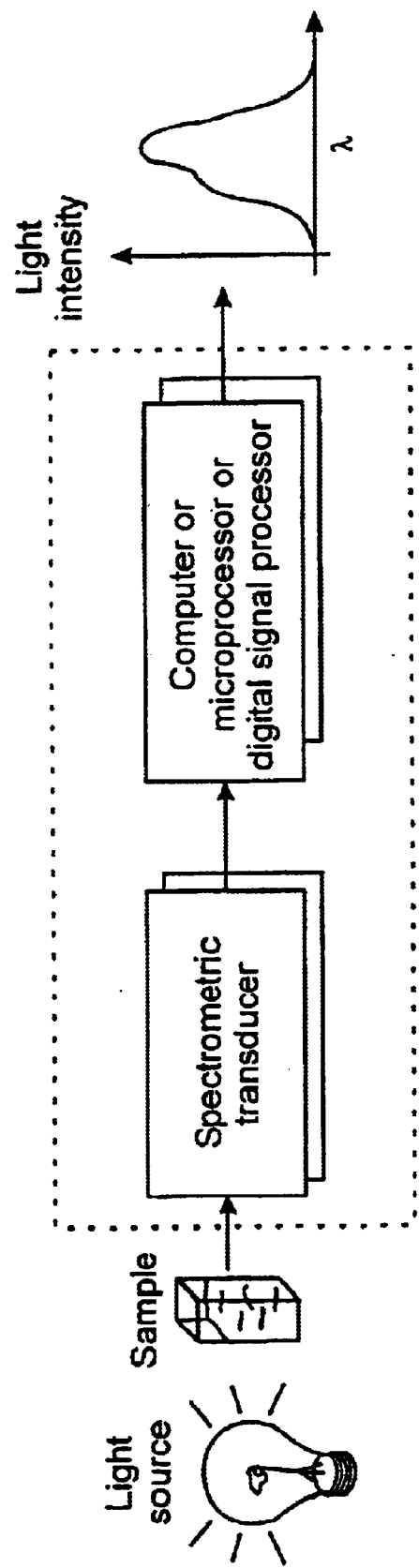
FIG. 8 is a simplified diagram of a spectrometric apparatus; a computing means in the form of a microprocessor, such as a digital signal processor; and, FIGS. 9a through 9d are simplified flow diagrams of each of 4 steps according to an exemplary embodiment of the invention.
Figure 9A:
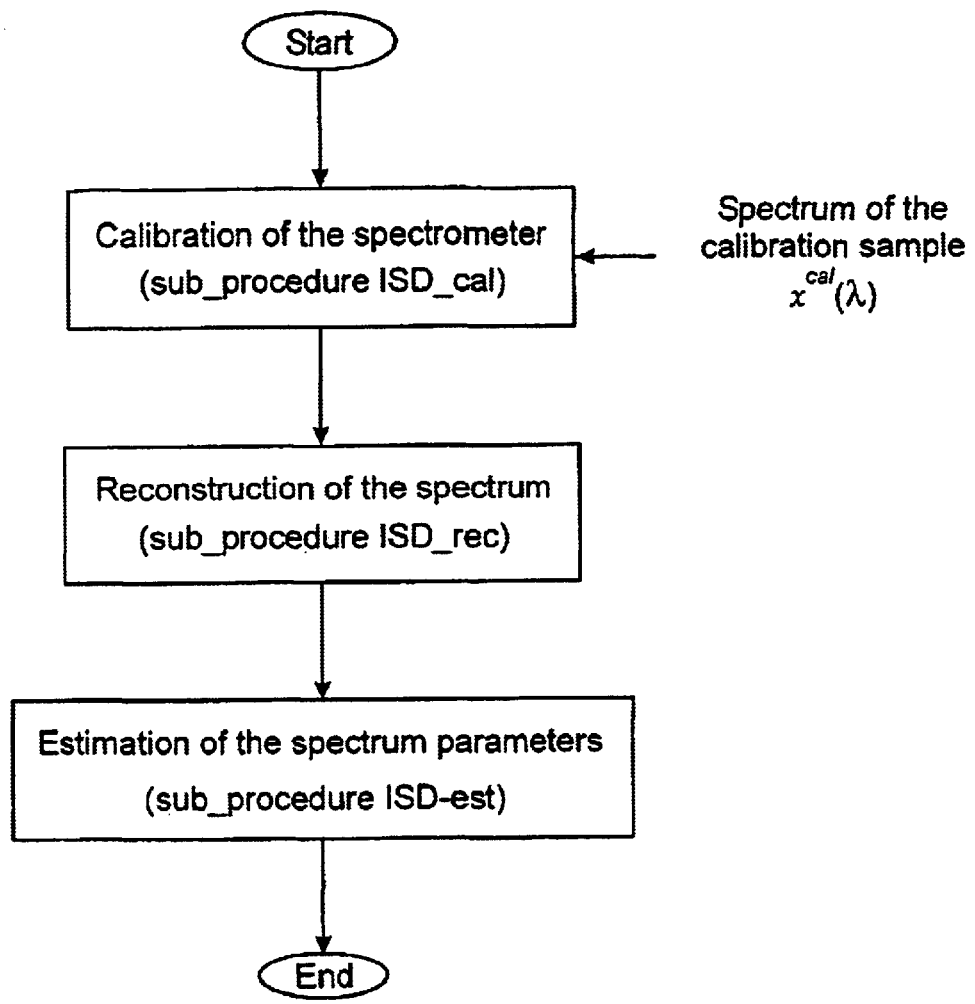
Figure 9B:
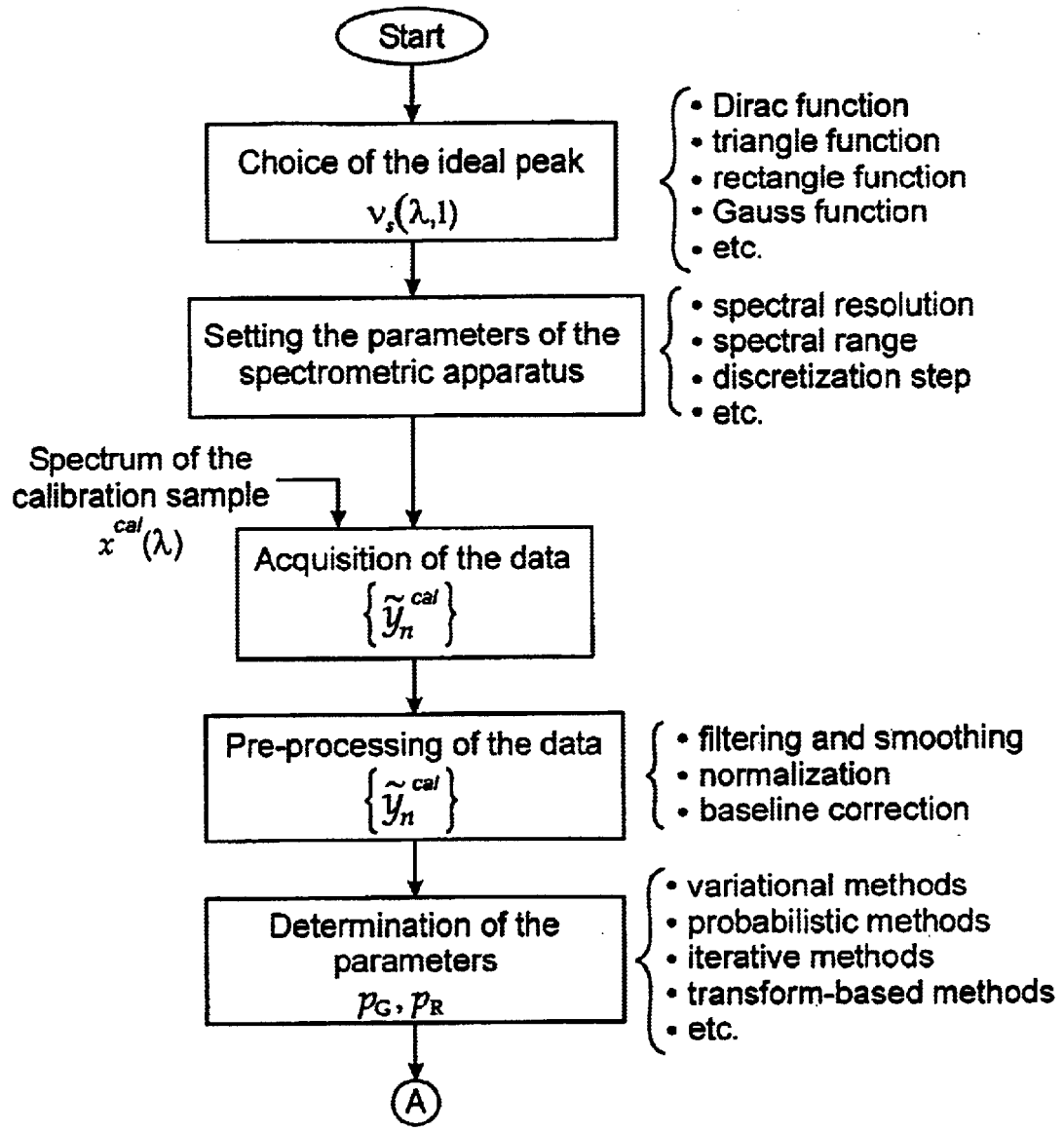
Figure 9C:
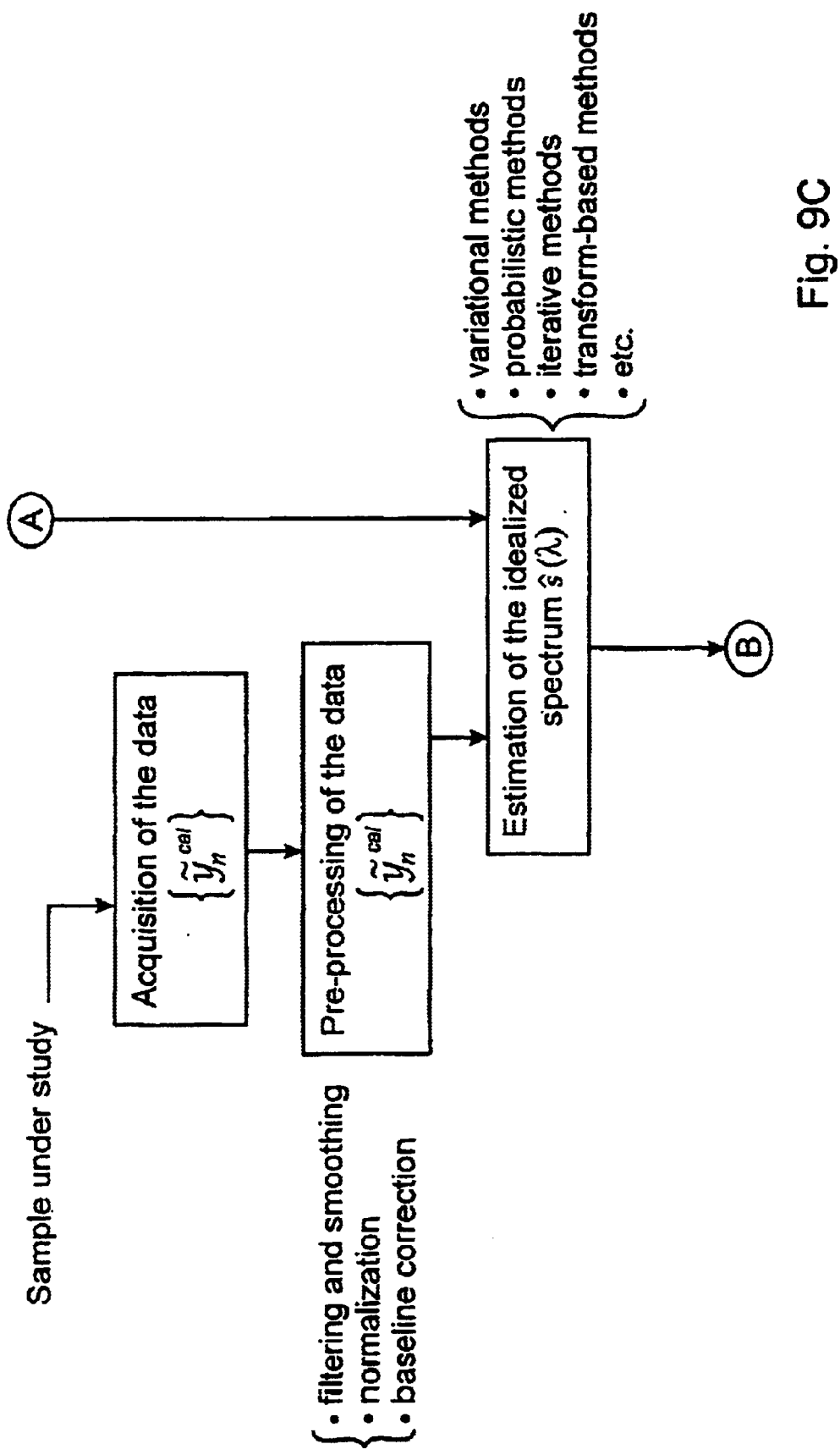
Figure 9D:
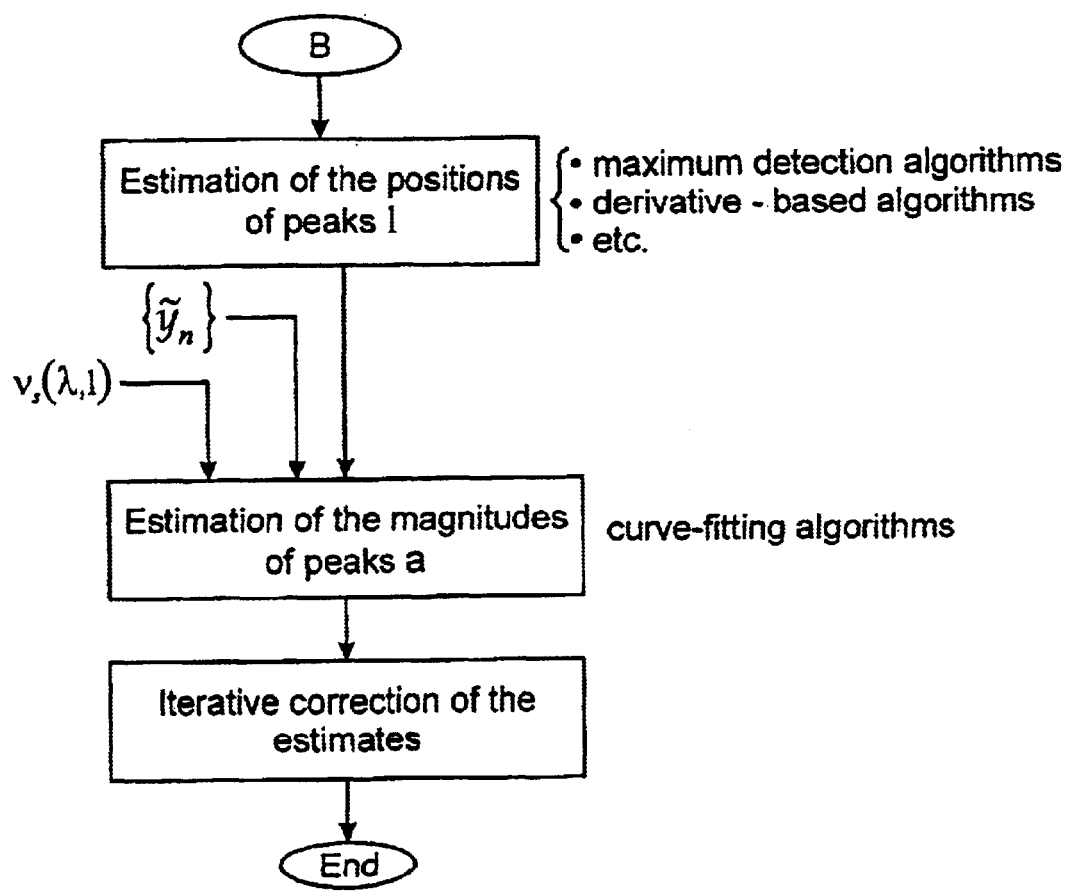

Referring to FIG. 8, a system is shown comprising the following: a spectrometric apparatus, in the form of a spectrometric transducer for converting an analogue electromagnetic signal, such as light containing information of a measured spectrum, into a digital electrical signal representing the spectrum; a computing means in the form of a microprocessor, a general-purpose digital signal processor, or an application-specific digital signal processor; and, other functional elements necessary for measuring a spectrum of a sample of an analyzed substance (hereinafter referred to as sample).

The method of augmenting spectra set out below is useful as a method implemented within the processor. It is described herein as an embodiment of a method of implementing spectral augmentation. Of course, MWOM may be provided with another suitable method as are known or may become known in the art. The method of augmenting spectra set out below is also for general application to other spectrometric devices.

The main objective of the method for spectral data processing is estimation of the positions l and magnitudes a of the peaks contained in the spectrum of a light signal $x(\lambda)$ on the basis of the data $\{\tilde{y}_n\}$. The feasibility of performing this operation accurately is critically conditioned by the quality of the results of calibration of the opto-electronic part of MWOM performed using the reference data $\{\tilde{y}_n^{cal}\}$ and the corresponding reference spectrum $x^{cal}(\lambda)$. Those results are preferably in the form of the parameters of a mathematical model of a relationship between spectrometric data and an idealised spectrum, the model which underlies the method according to the present embodiment for estimation of the parameters l and a. Although calibration does not necessarily directly precede augmentation of a sequence of spectrometric data $\{\tilde{y}_n\}$, valid calibration results should be available during this process.

A significant difficulty, related to estimation of positions l and magnitudes a of spectrometric peaks, relates to blurring of those peaks caused by imperfections in the opto-electronic part of MWOM, such as endface abnormalities, fibre misalignment, grating imperfections and, independently sensable parameters such as temperature. This difficulty is overcome according to the present method through the reconstruction of an idealised spectrum $s(\lambda;l,a)$ in order to correct the spectrometric data by, for example, i.e. reducing the effect of blurring.

In accordance with the above general functional requirements and referring to FIGS. 9a through 9d, the method comprises the following steps:

calibration of the opto-electronic part of MWOM (the sub-process ISD_cal), reconstruction of the idealised spectrum $s(\lambda;l,a)$ (the sub-process ISD_rec), estimation of the parameters l and a on the basis of an estimate $\hat{s}(\lambda)$ of $s(\lambda;l,a)$ (the sub-process ISD_est).

Sub-Process ISD_Cal

The sub-process ISD_cal comprises the following steps:

a) choosing a form of the ideal peak $v_s(\lambda,l)$ and of the operators G and R;

b) choosing a light signal for calibration, the signal whose spectrum $x^{cal}(\lambda)$ is known;

c) acquiring the data $\{\tilde{y}_n^{cal}\}$ representative of the reference spectrum $x^{cal}(\lambda)$;

d) pre-processing of the data $\{\tilde{y}_n^{cal}\}$ to eliminate outliers, to perform baseline correction, smoothing, acquiring a priori information in the form of a pre-estimate of the variance of errors in the calibration data, and normalisation; and, e) determining the parameters $p_G$ of the projection operator G, and the parameters $p_R$ of the reconstruction operator R.

A process of parameter estimation is preferably designed or tuned for use with a specific MWOM. For example, when known variance exists in a type of its dispersive element, this a priori knowledge may be used for optimising the estimation process. Of course, this is not necessary if a method for estimation is applied that is not adapted for incorporation of such information such as the least-squares method.

Sub-Process ISD_Rec

The sub-process ISD_rec comprises the following steps:

a) acquiring the data $\{\tilde{y}_n\}$ representative of an analysed light signal;

b) pre-processing of the data $\{\tilde{y}_n\}$ in a similar fashion to the pre-processing of the calibration data; and, c) estimating an idealised spectrum s(λ;l,a) on the basis of the data $\{\tilde{y}_n\}$, by means of the predetermined operator R with the parameters $p_R$.

Sub-Process ISD_Est

The sub-process ISD_est comprises the following steps:
a) estimating positions l of peaks on the basis of the estimate $\hat{s}(\lambda)$ of s(λ;l,a) by means of a maximum-detection method;
b) estimating magnitudes a of the peaks, by means of a curve-fitting method using one of the following:
   the data $\{\tilde{y}_n\}$, $v_s(\lambda,l)$, the operator G with the parameters $p_G$, and the estimate $\hat{l}$;
   the estimate $\hat{s}(\lambda)$, $v_s(\lambda,l)$, and the estimate $\hat{l}$.
c) iteratively correcting the estimates of the parameters of peaks obtained in (a) and (b); and,
d) adapting the results of parameter estimation to user requirements, e.g. transformation of the parameter estimates into some pre-defined parameters of the telecommunication channels.

The idealised spectrum $s(\lambda; l^{cal}, a^{cal})$ of the light signal used for calibration is assumed to have the form:

$$s(\lambda; l^{cal}, a^{cal}) = \sum_{k=1}^{K} a_k^{cal} v_s(\lambda, l_k^{cal})$$

The chosen operator of projection, for mapping an idealised spectrum s(λ;l,a) into the data space:

$$\{\tilde{y}_n\} = G[s(\lambda;l,a); p_G]$$

is defined by the following operations:

$$x(\lambda) = \int_{-\infty}^{+\infty} g_{sx}(\lambda - \lambda') s(\lambda'; l, a) d\lambda'$$

$$y(\lambda) = \int_{-\infty}^{+\infty} g_{xy}(\lambda - \lambda') x(\lambda') d\lambda'$$

$$\hat{y}_n = \alpha_n \int_{-\Delta\lambda/2}^{+\Delta\lambda/2} y(\tilde{\lambda}_n + \lambda) d\lambda + \beta_n \text{ for } n = 1, \ldots, N$$

Consequently, the vector of the parameters $p_G$ of the operator G contains discrete values of the functions $g_{sx}(\lambda)$ and $g_{xy}(\lambda)$, and the parameters $\alpha_n$ and $\beta_n$ (for n=1, ..., N).

The chosen operator of reconstruction, for transforming the data $\{\tilde{y}_n\}$ into an estimate $\hat{s}(\lambda)$ of s(λ;l,a):

$$\hat{s}(\lambda) = R[\{\tilde{y}_n\}; p_R]$$

is specified by the following steps:
a discrete estimate $\{\hat{x}_n\}$ of x(λ) is found by means of a special digital filter, e.g. a rational filter, applied to the data $\{\tilde{y}_n\}$; and,
an estimate $\hat{s}(\lambda)$ of s(λ;l,a) is computed using Kalman-type filter, e.g. a spline-based Kalman filter, applied to $\{\tilde{x}_n\}$.

Consequently, the vector $p_R = [p_{R,1} p_{R,2} \ldots]^T$ of the parameters of the operator R contains the coefficients of the special digital and the parameters of the Kalman-type filter.

The following operations are performed during calibration:
identification of the function $g_{sx}(\lambda)$ and $g_{xy}(\lambda)$, using a precise spectrum analyser for measuring the function $g_{sx}(\lambda)$ and an optimisation process for estimation of the function $g_{xy}(\lambda)$;
determination of the coefficients of the special digital filter using an optimisation process; and, determination of the parameters of the Kalman-type filter, using an optimisation process.

As is evident to those of skill in the art, application of a method as herein described allows for capturing of spectral information with photodetectors that are other than aligned in a predetermined fashion, generation of an approximately continuous spectrum from the captured data, and channelising the data in accordance with design requirements for MWOM. Further, re-calibration will allow for a change in the number of channels supported by MWOM.

Advantageously, application of the above method provides for increased accuracy of channel monitoring, resulting from correction of instrumental errors and reduction of uncertainty of the estimates of channel parameters. A reduced cost of MWOM with a given accuracy is achieved by replacing its higher-resolution optical and opto-electronic parts with a low-resolution functional equivalents.

Many variations of the mathematical models and related processes are useful in a method according to the invention. Though the above description is with respect to a single set of equations for augmenting resolution of a spectrum, other equations are also applicable. Some examples of other approaches for augmenting spectra according to the present invention are described below.

Optionally, the following mathematical models of the spectrometric data may be used for defining the operator G:
a) the non-stationary linear model:

$$x(\lambda) = \int_{-\infty}^{+\infty} g_{sx}(\lambda, \lambda') s(\lambda'; l, a) d\lambda'$$

$$y(\lambda) = \int_{-\infty}^{+\infty} g_{xy}(\lambda, \lambda') x(\lambda') d\lambda'$$

b) the non-linear model of the form:

$$x(\lambda) = \int_{-\infty}^{+\infty} g_{sx}(\lambda, \lambda') F_s[s(\lambda'; l, a)] d\lambda'$$

$$y(\lambda) = F_y \left[ \int_{-\infty}^{+\infty} g_{xy}(\lambda, \lambda') F_x[x(\lambda')] d\lambda' \right]$$

where at least one of the functions $F_s$, $F_x$ or $F_y$ is non-linear.

Optionally, the following methods deconvolution or generalised deconvolution are used for defining the operator R:
c) the original domain, numerical differentiation-based method as described by Morawski & Sokolowski in 1995;
d) the iterative methods of Jansson and Gold;
e) the spectrum-domain, Tikhonov-regularisation-based method;
f) the cepstrum-domain, Tikhonov-regularisation-based method;
g) the original-domain, Tikhonov-regularisation-based method with the positivity constraint imposed on the solution;
h) the Kalman-filter-based method with with the positivity constraint imposed on the solution;
i) the Kalman-filter-based method with spline-approximation of the solution;
j) the adjoint-operator method as described by Morawski & Pawinski in 1995;
k) the entropy-based variational method;
l) the Volterra-series-based methods;
m) the rational-filter-based method as described by Szczecinski et al. in 1997.

Moreover, many other methods developed in the domain telecommunications, seismology and image processing are applicable with the method according to the invention for spectral resolution augmentation. Selection of mathematical methods for use in the present invention is straightforward for one of skill in the art without undue experimentation.

Calibration is also described above with relation to an exemplary embodiment thereof. Optionally, the isolated peak $v_s(\lambda,l)$ is assumed to have the following forms:

c) the Dirac distribution $\delta(\lambda)$ for all values of l;

d) a triangle whose width is constant or varying versus l;

e) a rectangle whose width is constant or varying versus l;

f) a Gauss function whose width is constant or varying versus l; and, g) a Lorenz function whose width is constant or varying versus l.

Optionally, at least one of the following methods is used for estimation of the apparatus function $g_{xy}(\lambda)$:

c) smoothing approximation applied directly to the data $\{\tilde{y}_n^{cal}\}$ if the isolated peak $v_s(\lambda,l)$ is assumed to have the form of the Dirac distribution $\delta(\lambda)$;

d) deconvolution of the data $\{\tilde{y}_n^{cal}\}$ with respect to $s(\lambda;l^{cal},a^{cal})$; and e) subsequent use of deconvolution and smoothing approximation.

Optionally, at least one of the following methods may be used for determining other parameters of the operator R:

c) a direct transformation of the parameters of the operator G;

d) the minimisation of any norm of the solution $\|p_R\|$ under constraints imposed on another norm of the discrepancy $\|s(\lambda;l^{cal},a^{cal})-R[\{\tilde{y}_n^{cal}\};p_R]\|$ and, e) the minimisation of any norm of the discrepancy $\|s(\lambda;l^{cal},a^{cal})-R[\{\tilde{y}_n^{cal}; p_R]\|$ under constraints imposed on another norm of the solution $\|p_R\|$.

Optionally, at least one of the following methods is used for estimation of the magnitudes a of peaks, given the estimates $\hat{l}$ of their positions l:

$$\hat{a}=arg_a inf\{\|\tilde{y}_n\}-G[s(\lambda;\hat{l},a);p_G]\|_q | a \in A\}; \text{ and}$$

$$\hat{a}=arg_a inf\{\|\tilde{s}(\lambda)-s(\lambda;\hat{l},a)\|_q | a \in A\}$$

with A-being a set of feasible solutions; options: q=2 and $A \subset R^k$; q=$\infty$ and $A \subset R^k$; q=2 and $A \subset R_+^k$; q=$\infty$ and $A \subset R_+^k$. Some examples of algorithmic solutions are given in Deming S. N., Morgan S. L.: *Experimental Design: A Chemometric Approach*, Elsevier 1987; Fraser R. D. B., Suzuki E.: "Biological Applications". In: *Spectral Analysis—Methods and Techniques* (ed by J. A. Balckburn), M. Dekker, 1970, pp. 171–211; Fister III J. C., Harris J. M.: "Multidimensional Least Squares Resolution of Excited State Raman Spectra", *Anal. Chem.,* Vol. 67, No. 4, 1995b, pp.701–709; Fister III J. C., Harris J. M.: "Multidimensional Least Squares Resolution of Raman Spectra from Intermediates in Photochemical Reactions", *Anal. Chem.,* Vol.67, No.8, 1995a, pp.1361–1370; Goodman K. J., Brenna T.: "Curve Fitting for Restoration of Accuracy of Overlapping Peaks in Gas Chromatography/Combustion Ratio Mass Spectrometry", *Anal. Chem.,* Vol.66, No. 8, 1994, pp. 1294–1301; Miekina et al. "Incorporation of the Positivity Constraint into a Tikhonov-method-based Algorithm of Measurand Reconstruction". *Proc. IMEKO-TC1&TC7 Colloquium* (London, UK, Sept. 8–10, 1993), pp. 299–304 and so forth. A particularly effective solution of the above optimization problem is based on a non-stationary Kalman filter or an adaptive LMS algorithm as described in Ben Slima M., Szczecinski L., Massicotte D., Morawski R. Z., Barwicz A.: "Algorithmic Specification of a Specialized Processor for Spectrometric Applictions", *Proc. IEEE Instrum. & Meas. Technology Conf.* (Ottawa, Canada, May 19–21, 1997), pp. 90–95 and in Ben Slima M., Morawski R. Z., Barwicz A.: "Kalman-filter-based Algorithms of Spectrophotometric Data Correction—Part II: Use of Splines for Approximation of Spectra", *IEEE Trans. Instrum. & Meas.,* Vol. 46, No. 3, June 1997, pp. 685–689.

Optionally, methods for estimation of the magnitudes a are used for iterative correction of estimates of magnitudes a and positions l of the peaks. Known methods include the alternate use of the following formulas:

$$\hat{a}=arg_a inf\{\|s(\lambda)-s(\lambda; \hat{l},a)\|_q | a \in A\}$$

and, $$\hat{l}=arg_l inf\{\|s(\lambda)-s(\lambda;l,a)\|_q | l \in L\}$$

with q=1, 2, or $\infty$, and L being a set of feasible solutions for l, A being a set of feasible solutions for a, According to the method set out above, the data are pre-processed. The pre-processing is performed according to known techniques and for known purposes with relation to the methods selected for augmenting resolution of the spectral data. Optionally, one of the following methods is used for normalisation of the data:

a) the linear or nonlinear transformation of the $\lambda$-axis, aimed at diminishing the non-stationarity effects in the data;

b) the linear or nonlinear transformation of the y-axis, aimed at diminishing the non-linearity effects in the data;

c) the linear or nonlinear transformation of the $\lambda$-axis and y-axis, aimed at diminishing the non-stationarity and non-linearity effects in the data.

Optionally, one of the following methods may be used for smoothing the data:

a) the linear, FIR-type or IIR-type, filtering;

b) the median filtering;

c) the smoothing approximation by cubic splines;

d) the deconvolution with respect to an identity operator.

Baseline correction is performed according to standard known techniques such as those described in Brame E. G., Grasselli J., *Infrared and Raman Spectroscopy,* Marcel Dekker 1976.

Of course, in many instances it is only desirable to correct the captured spectral data for input port and output port alignment errors such as those relating to fibre placement and angle. That said, once data processing is occurring, it is often useful to enhance the resolution of the MWOM or to extract other data such as a signal-to-noise level, a noise-floor level, peak signal strengths, channel separation and so forth.

For the present method, the step of calibration includes a step of determining detector array alignment—determining a transform to correct for a misalignment of or within the detector array. By using a single detector per channel, a simple MWOM is possible. By adding additional detectors per channel, further parameters such as noise levels within each channel and so forth are extractable. It is preferred that at least three detectors exist per channel within the detected spectrum of light.

For example, in order to simplify assembly of MWOM, a detector array is selected having more detectors than there are channels and preferably more than three times as many detectors as channels. Thus for MWOM requiring a number of detectors N, an array with more detectors N+ΔN is chosen. ΔN is selected to provide a detector at a predetermined first location and at a predetermined last location regardless of detector alignment error. Thus, when alignment is within one detector location of perfect alignment in either direction, ΔN=2—one extra detector at each end of the array. Of course a large ΔN allows for more imperfect alignment of the detector array. Since the calibration step occurs after assembly, only data from N detectors—or possibly N+1 detectors—are typically used in the processing step. Typically, these are the only detectors that receive data within the MWOM's range. Of course, when optical imperfections exist within MWOM and alignment error exists as well, data from more than N+1 detectors are often useful for enhancing the overall monitoring results. That said, it is not foreseen that data from many more than N+6 detectors would be advantageous, though this is also possible in some situations.

Since there are ΔN extra detectors, and the analysed spectrum is effectively continuous, the positioning of the array is not critical, and calibration and processing corrects for array misalignment. The axis, which is now tolerant to alignment imperfections, is shown in FIG. 4. It will be apparent to those skilled in the art that the detector array is preferably provided with substantially tall detector elements perpendicular to the coarse adjustment axis to ensure that it always has coupling of light from the monitor substrate. Thus, the detector is only aligned accurately in an angular sense. Those skilled in the art of production assembly will realise the comparative simplicity of the invention for a sufficiently long flat part or in place of a sufficiently large number of fibre connections.

Application of the above method allows for extraction of channelised data from within the spectral data even when the captured data are other than channelised and the detector array is other than accurately aligned. Since calibration occurs with a known light source, it is, according to the method described above, evident that the wavelength range each detector detects is determined in calibration as are flaws in the optical device—within certain limits. Thus a few endface abrasions which redirect light along other paths toward other detectors are compensated for in the transfer function so determined. The result is an accurate monitoring device absent extremely fine manufacturing tolerances required presently for equivalent devices.

Of course, when the detector array is sufficiently "tall"—having a dimension perpendicular to a line through the array of detector elements and parallel to the detector input endface that is longer than the thickness of the guided region within the waveguide by a substantial amount, angular alignment is not required since a method of correcting for displacement linearly and angularly is supported. That said, it is preferred that each location along the guided portion of the waveguide where light is expected to exit the waveguide for monitoring thereof has a detector adjacent thereto for detecting the exiting light.

Though the embodiment of FIG. 3 is described with reference to a detector array affixed to the endface of the device 200, it is also possible to affix a plurality of fibres thereto, such as a fibre ribbon, and to correct for misalignment of the ribbon using a method such as those described above. Such a manufacturing step is considered less preferable since the fibres must then be coupled to the detector array adding two additional manufacturing steps.

In this application, as shown in FIG. 3, the input port is optically coupled to an optical fibre for guiding light from the optical fibre into a guided region 210. The guided region provides the light at a predetermined location and angle to the dispersive element. The position of the fibre adjacent the guiding region 210 determines coupling efficiency of the device and is considered an important aspect of manufacture.

Figure 5:
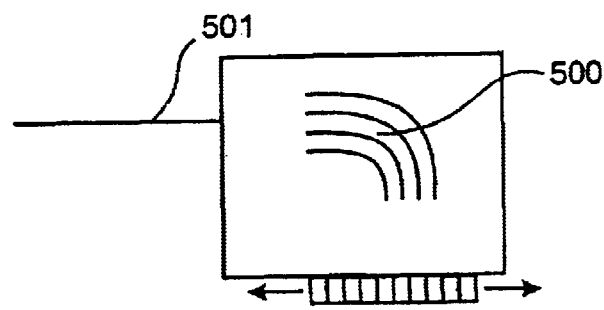
FIG. 5 is a simplified schematic diagram demonstrating coarse alignment of an input fibre relative to a substrate for an optical monitor.

That said, from the above description, it is clear that by increasing ΔN it is possible to provide light directly from the fibre to the dispersive element absent a guiding region 210 therebetween. An illustration of this is provided in FIG. 5. Here, positioning of the fibre determines the location of the optical signal as it enters the wavelength-dispersing element 500. Since the location of the dispersed light forming a spectrum is no longer critical, the fibre 501 is coupled to the slab waveguide approximately at a known location though accuracy of alignment is again not necessary. This results in a loosening of tolerance in positioning the optical fibre as shown in FIG. 4. Errors in alignment of the optical fibre and their overall effects are shown in FIG. 5.

Figure 6:
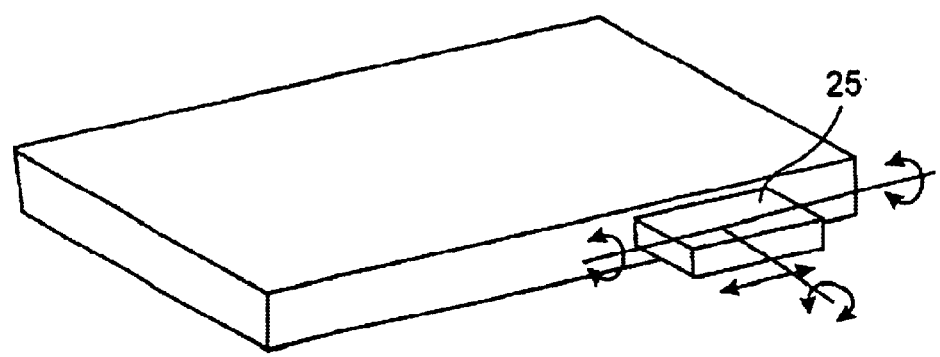
FIG. 6 is a simplified spatial diagram demonstrating degrees of freedom in optical detector alignment with the substrate for use as a multi-wavelength optical monitor.

Referring to FIG. 6, a diagram of potential errors in positioning of the detector array that are correctable with the method of the present invention is shown. The detectors can move laterally or angularly. Further, some detectors can receive light that is other than properly directed thereto so long as there is not so much distortion to prevent the method from reconstructing the spectrum.

According to an embodiment, in order to ensure that MWOM continues to produce accurate output in different environmental conditions a temperature sensor is attached to the monitor. The sensor communicates with the processor to ensure variations in temperature are compensated for in MWOM. This eliminates a need to actively control the temperature of the monitor. Of course, when the angle of dispersion of the dispersive element changes dramatically with temperature variations, it is desirable to have sufficient detector elements within the array to sense the dispersed light at any angle possible within the temperature range of operation of the device. Further preferably, each MWOM is calibrated for temperature response as well, in order to allow processing to correct for temperature effects.

When the processor is used for temperature compensation, the optical fibre coupling is also freed of necessary temperature compensation packaging. Small movements between the fibre end and the integrated waveguide device are correctable through further processing and, as such are tolerable.

In U.S. Pat. Nos. 6,002,479 and 5,991,023 are described methods of processing sensed spectral data to produce enhanced estimates of spectra based on a step of calibration. Test results and other data therein may be useful to one of skill in the art in better following the teachings herein.

Numerous other embodiments may be envisaged within the spirit or scope of the invention.

What is claimed is:

1. A method of fabricating an optical component comprising the steps of: providing a detector array having more detectors than a number of known channels; providing an input port and dispersive element within a waveguide structure, the dispersive element disposed for receiving light provided at the input port and for dispersing the light onto a plane disposed adjacent the detector array, the light dispersed other than as channelised data within the known channels and the detector array having detectors along a length substantially exceeding the length of the light within the known channels dispersed along the plane; and, determining an operator for transforming spectral data sensed by the detector array into values indicative of intensity of light within each of the predetermined wavelength ranges corresponding to the known channels, the operator is dependent upon array location adjacent the plane to correct for tolerances in array placement, and upon optical variations in the waveguide and included structures for compensating therefore, with the operator accommodates variable data provided in response to external sensor data.

2. A method of fabricating an optical component according to claim 1 comprising a temperature sensor for providing the external sensor data.

3. A method of fabricating an optical component according to claim 1 wherein the operator is dependent upon input port location.

4. A method of fabricating an optical component according to claim 1 wherein the operator a accommodates variable data provided in response to external sensor data.

5. A method of fabricating an optical component according to claim 4 comprising a temperature sensor for providing the external sensor data.

6. A method of fabricating an optical component according to claim 1 wherein the detector array is positioned adjacent the plane for receiving most of the dispersed light dispersed while the component operates within any temperature within a predetermined temperature range.

7. A method of fabricating an optical component according to claim 6 wherein a detector at each of two opposing ends of the array of detectors is positioned to receive no light in use at a temperature central to the temperature range.

8. A method of fabricating an optical component according to claim 1 wherein the detector array comprises at least a number of detectors equal to three times the number of known channels.

9. A method of fabricating an optical component according to claim 8 wherein the detector array comprises at least a number of detectors equal to three times the number of known channels plus two further detectors.

10. A method of fabricating an optical component according to claim 1 wherein the dispersive element comprises an array waveguide grating.

11. A method of fabricating an optical component according to claim 10 wherein the detector array is adjacent an unguided portion of the array waveguide grating and wherein the component is absent a plurality of waveguides exiting the array waveguide grating.

12. A method of fabricating an optical component according to claim 11 wherein the input port is adjacent an unguided portion of the array waveguide grating and wherein the component is absent an integrated waveguide for guiding light into the array waveguide grating.

13. A method of fabricating an optical component according to claim 10 wherein the input port is adjacent an unguided portion of the array waveguide grating and wherein the component is absent an integrated waveguide for guiding light into the array waveguide grating.

14. A method fabricating an optical component according to claim 1 wherein the operator is determined a digital signal processor associated with the optical component.

15. A method of fabricating an optical component according to claim 14 wherein the optical component comprises the digital signal processor.

16. A method of fabricating an optical component according to claim 14 wherein the operator is determined independently for each optical component.

17. A method of fabricating an optical component according to claim 16 wherein the optical component is an optical wavelength monitor.

18. A method of fabricating an optical component according to claim 1 wherein the optical component is an optical wavelength monitor.

19. A method of fabricating an optical component according to claim 1 wherein the detector array is positioned for receiving most of the dispersed light dispersed while the component operates within any temperature within a predetermined temperature range and a detector at each of two opposing ends of the array of detectors is positioned to receive no light in use at a temperature central to the temperature range.

20. An optical component comprising: an input port; a detector array for sensing data and having more detectors than a number of known channels; a waveguide structure including a dispersive element within the waveguide structure, the dispersive element dispose for receiving light provided at the input port and for dispersing the light onto the detector array, the light dispersed other than as channelised data within the known channels; and a processor for determining a operator for transforming data sensed by the detector array into values indicative of intensity of light within each of the predetermined wavelength ranges corresponding to the known channels, wherein the operator accommodates imprecise placement of the detector array and a temperature sensor for providing external sensor data and wherein the operator accommodates the external sensor data.

21. An optical component according to claim 20 wherein the detector array is positioned adjacent the dispersive element for receiving most of the dispersed light dispersed while the component operates within any temperature within a predetermined temperature range.

22. An optical component according to claim 21 wherein a detector at each of two opposing ends of the array detectors is positioned to receive no light in use at a temperature central to the temperature range.

23. An optical component according to claim 20 wherein the input port location is determined during manufacture based on a location wherein light is coupled into an unguided region of the dispersive element.

24. An optical component according to claim 23 wherein the dispersive element is an array waveguide grating.

25. An optical component according to claim 20 wherein the detector array comprises at least a number of detectors equal to three times the number of known channels.

26. An optical component according to claim 25 wherein the detector array comprises at least a number of detectors equal to three times the number of known channels plus two further detectors.

27. An optical component according to claim 20 wherein the dispersive element comprises an array waveguide grating.

28. An optical component according to claim 27 wherein the detector array is disposed adjacent an unguided portion of the array waveguide grating and wherein the optical component is absent a plurality of integrated waveguides exiting the array waveguide grating.

29. An optical component according to claim 28 wherein the input port is adjacent an unguided portion of the array waveguide grating and wherein the component is absent an integrated waveguide for guiding light into the array waveguide grating.

30. An optical component according to claim 27 wherein the input port is adjacent an unguided portion of the array waveguide grating and wherein the component is absent an integrated waveguide for guiding light into the array waveguide grating.

31. An optical component according to claim 20 wherein the processor comprises a digital signal processor associated with the optical component.

32. An optical component according to claim 20 wherein the optical component includes an optical wavelength monitor.

33. A method of fabricating an optical component according to claim 20 wherein the detector array has detectors along a length substantially exceeding the length of the dispersed light within the known channels.

* * * * *